United States Patent
Kim et al.

(10) Patent No.: US 10,971,961 B2
(45) Date of Patent: Apr. 6, 2021

(54) ROTOR SLEEVE OF DRIVING MOTOR AND DRIVING MOTOR INCLUDING THE SAME

(71) Applicants: Hyundai Motor Company, Seoul (KR); Kia Motors Corporation, Seoul (KR)

(72) Inventors: Tae Kil Kim, Gyeonggi-do (KR); Chul Min Ahn, Gyeonggi-do (KR); Dae Woong Han, Gyeonggi-do (KR); Jae Young Choi, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/450,394

(22) Filed: Jun. 24, 2019

(65) Prior Publication Data
US 2020/0153300 A1    May 14, 2020

(30) Foreign Application Priority Data
Nov. 13, 2018    (KR) .................. 10-2018-0139264

(51) Int. Cl.
*H02K 1/32*    (2006.01)
*H02K 9/19*    (2006.01)
*H02K 1/30*    (2006.01)

(52) U.S. Cl.
CPC .............. *H02K 1/32* (2013.01); *H02K 1/30* (2013.01); *H02K 9/19* (2013.01)

(58) Field of Classification Search
CPC .. H02K 1/30; H02K 1/32; H02K 9/19; H02K 7/006
See application file for complete search history.

(56) References Cited

U.S. PATENT DOCUMENTS

| | | | | |
|---|---|---|---|---|
| 3,629,628 A * | 12/1971 | Rank | .................... | B60L 3/0061 310/54 |
| 4,418,777 A * | 12/1983 | Stockton | ............. | F16H 57/0413 180/65.6 |
| 4,602,177 A * | 7/1986 | Eckels | .................... | H02K 9/20 165/288 |
| 5,189,325 A * | 2/1993 | Jarczynski | ............... | H02K 9/19 310/54 |
| 6,772,504 B2 * | 8/2004 | Weidman | .................. | H02K 1/32 29/598 |
| 8,492,941 B2 * | 7/2013 | Endo | ........................ | H02K 1/32 310/59 |

(Continued)

FOREIGN PATENT DOCUMENTS

JP         5772844 B2    9/2015
KR    10-2011-0046151 A    5/2011
(Continued)

*Primary Examiner* — Dang D Le
(74) *Attorney, Agent, or Firm* — Mintz Levin Cohn Ferris Glovsky and Popeo, P.C.; Peter F. Corless (57) ABSTRACT

A rotor sleeve provides a direct cooling method in which oil flows into the rotor sleeve via a flow passage formed through an input shaft of a transmission and is distributed to a motor coil of a driving motor to cool the motor coil. The rotor sleeve has a flow passage structure capable of maintaining a balance between the amount of oil to be distributed toward a transmission and the amount of oil to be distributed toward an engine.

12 Claims, 6 Drawing Sheets

(56) References Cited

U.S. PATENT DOCUMENTS

| | | | | |
|---|---|---|---|---|
| 8,841,814 | B2* | 9/2014 | Arimatsu | H02K 1/30 |
| | | | | 310/216.121 |
| 10,615,665 | B2* | 4/2020 | Scharlach | H02K 1/32 |
| 2003/0030333 | A1* | 2/2003 | Johnsen | H02K 1/32 |
| | | | | 310/54 |
| 2012/0194012 | A1* | 8/2012 | Chamberlin | H02K 9/19 |
| | | | | 310/54 |
| 2013/0038151 | A1* | 2/2013 | Ohashi | H02K 5/1737 |
| | | | | 310/59 |
| 2013/0278091 | A1* | 10/2013 | Ohashi | H02K 5/20 |
| | | | | 310/58 |

FOREIGN PATENT DOCUMENTS

| | | |
|---|---|---|
| KR | 10-2018-0068736 A | 6/2018 |
| KR | 10-2018-0068738 A | 6/2018 |

* cited by examiner

ROTOR SLEEVE OF DRIVING MOTOR AND DRIVING MOTOR INCLUDING THE SAME

CROSS-REFERENCE TO RELATED APPLICATION

This application claims under 35 U.S.C. § 119(a) the benefit of priority to Korean Patent Application No. 10-2018-0139264 filed on Nov. 13, 2018, the entire contents of which are incorporated herein by reference.

BACKGROUND

(a) Technical Field

The present invention relates to a rotor sleeve of a driving motor and a driving motor including the same, and more particularly, to a rotor sleeve for realizing a direct cooling method in which oil flows into the rotor sleeve via a flow passage formed through an input shaft of a transmission and is distributed to a motor coil of a driving motor to cool the motor coil, and a driving motor including the same.

(b) Background Art

Generally, hybrid vehicles include a driving motor and an engine as power sources. In a hybrid electric vehicle (HEV) mode, the driving motor operates together with the engine, and in an electric vehicle (EV) mode, the driving motor operates alone. To cool a motor coil, which is the main heat-generating source of a driving motor, oil, which is supplied through a flow passage formed through an input shaft connected to a transmission, is distributed to the motor coil. This direct cooling method is known as an effective motor coil cooling method. Additionally, in this direct cooling method, oil, which is supplied through the input shaft connected to the transmission, flows into a rotor sleeve via an engine clutch, and is distributed to the motor coil.

The oil, having flowed into the rotor sleeve, is discharged toward the transmission and the engine, and is distributed to the portions of the motor coil that are respectively disposed near the transmission and the engine. When cooling the driving motor, particularly, when cooling the motor coil, it is ideal for oil to be evenly distributed toward the transmission and the engine from the rotor sleeve. However, in the direct cooling method using oil distribution in the related art, oil is not evenly distributed toward the transmission and the engine. For example, the ratio of the amount of oil distributed to the portion of the motor coil near the transmission to the amount of oil distributed to the portion of the motor coil near the engine is approximately 6:1.

The above information disclosed in this section is merely for enhancement of understanding of the background of the invention, and therefore it may contain information that does not form the prior art that is already known in this country to a person of ordinary skill in the art.

SUMMARY

The present invention provides a rotor sleeve having a novel flow passage structure capable of maintaining a balance between the amount of oil to be distributed toward a transmission and the amount of oil to be distributed toward an engine, and a driving motor including the same.

In one aspect, the present invention provides a rotor sleeve of a driving motor, that may include spline grooves formed in the inner surface of the rotor sleeve, apertures formed in at least some of the spline grooves, and two or more slot portions formed in the outer surface of the rotor sleeve, the slot portions being configured to guide a fluid introduced through the apertures to outlet ports, wherein at least one of the slot portions may be connected to two or more of the apertures.

In addition, each of the slot portions may include an axial-directional slot connected to a respective one of the outlet ports, and the axial-directional slot may be formed in a smaller number than the number of the apertures. A retainer may be coupled to the rotor sleeve through the spline grooves, and the apertures may be disposed at positions further inward than the centers of the spline grooves in a direction in which the retainer is assembled or coupled.

The apertures may be formed at the same positions in an axial direction. The rotor sleeve may further include a groove formed in the outer circumferential surface of the rotor sleeve. Particularly, the groove may have an annular shape and may be connected to the apertures. Each of the slot portions may further include a circumferential-directional slot connected to the axial-directional slot, and the circumferential-directional slot may be connected to the apertures.

Further, each of the slot portions may have one of a "T" shape and an "L" shape. Each of the apertures may be formed in a respective one of the spline grooves. The spline grooves may be divided into a first group, in which the apertures are formed, and a second group, in which the apertures are not formed. The first group may have an axial-directional slope different from an axial-directional slope of the second group.

The axial-directional slope of the first group may be smaller than the axial-directional slope of the second group. Additionally, the spline grooves included in the second group may be disposed between adjacent ones of the spline grooves included in the first group. The number of the spline grooves included in the second group, disposed between adjacent ones of the spline grooves included in the first group, may be constant. In another aspect, the present invention provides a driving motor including the rotor sleeve described above and a stator core around which a coil is wound.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a rotor sleeve of a driving motor according to an exemplary embodiment of the present invention will be described in detail with reference to the accompanying drawings.

Figure 1:
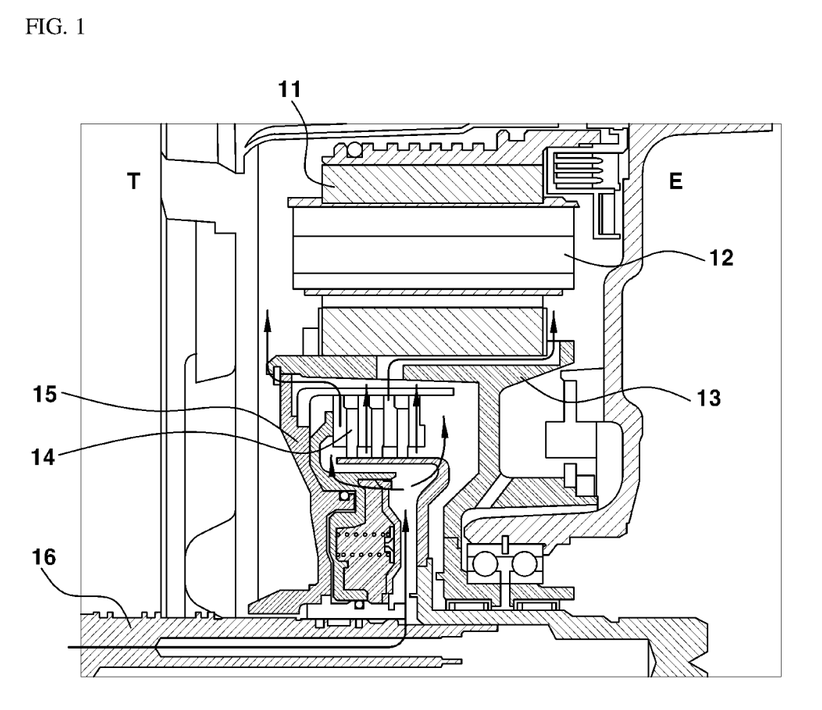
FIG. 1 is a view illustrating an oil-cooling structure of a driving motor, in which oil is distributed to a motor coil via a rotor sleeve to cool the motor coil according to an exemplary embodiment of the present invention.

FIG. 1 is a view illustrating an oil-cooling structure of a driving motor, in which oil is distributed to a motor coil via a rotor sleeve 13 to cool the motor coil. As illustrated in FIG. 1, the driving motor may include a rotor and a stator, which are disposed inside a motor housing. The driving motor illustrated in FIG. 1 is an interior-rotor-type motor, in which a coil 12 is wound around a stator core 11 disposed at an outer side and a rotor is disposed inside the stator core to be rotatable. When current is supplied to the coil 12, the rotor disposed at the inner side rotates.

The driving motor in FIG. 1 has an oil-scattering or oil-distributing structure in which oil, which is supplied through a flow passage formed through an input shaft 16 penetrating the center of the rotor, may be distributed to the coil 12 via the rotor sleeve 13. The rotor sleeve 13 may include a shaft aperture, through which the input shaft 16, connected to the transmission, may be inserted, and may have a cylindrical-shaped structure that forms an internal space that is open toward the transmission. An engine clutch may be disposed in the open internal space in the cylindrical-shaped rotor sleeve 13. A circular-plate-shaped retainer 15 may be coupled to the rotor sleeve 13 and may cover the internal space in the rotor sleeve 13.

As illustrated in FIG. 1, the oil, supplied toward the flow passage formed through the input shaft by the oil pump, may flow into the internal space in the rotor sleeve 13. As the rotor sleeve 13 rotates, the oil may flow downwards in the gravitational direction. Thereafter, the oil may flow toward the cylindrical-shaped wall of the rotor sleeve 13 via the engine clutch disposed in the internal space in the rotor sleeve 13, and may be distributed to the motor coil 12 via two flow passages formed in the cylindrical-shaped wall of the rotor sleeve 13 to be respectively oriented toward the transmission and the engine.

The arrows in FIG. 1 indicate the scattering or distribution paths of the oil. FIG. 1 illustrates that the oil introduced into the rotor sleeve 13 via the input shaft is dispersed into two paths directed toward the transmission and the engine and is distributed to the motor coil 12. The present invention provides a rotor sleeve having an oil-scattering or oil-distributing structure capable of more evenly distributing oil toward the transmission and the engine via two scattering paths.

Figure 3:
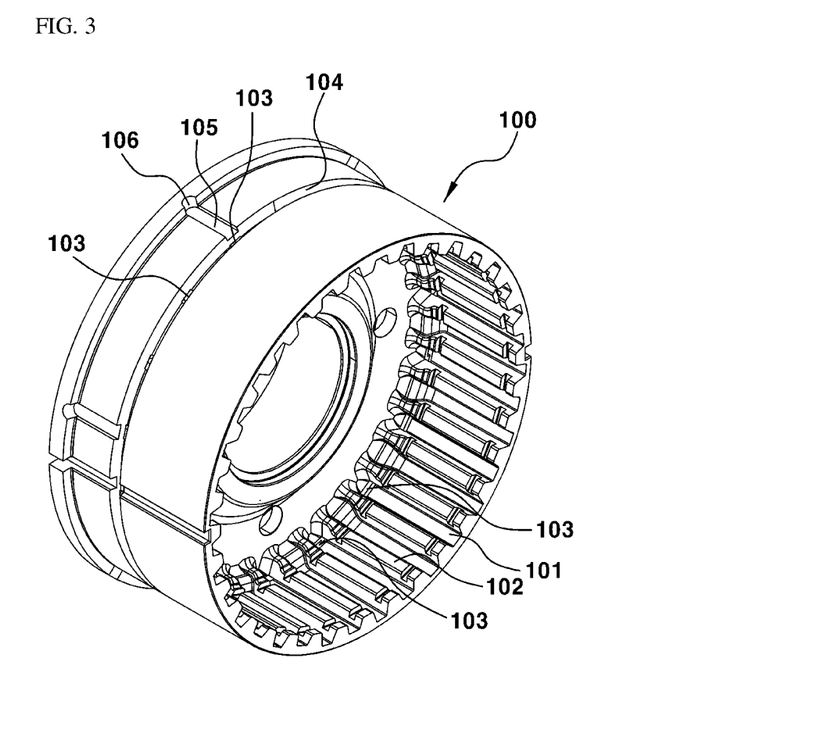
FIG. 3 is a partially-cut perspective view illustrating a portion of the rotor sleeve in FIG. 2 according to an exemplary embodiment of the present invention.

FIG. 3 illustrates a rotor sleeve according to an exemplary embodiment of the present invention. As described above, the rotor sleeve illustrated in FIG. 3 may include a shaft aperture formed through the center thereof, through which an input shaft may be inserted, and a cylindrical-shaped structure that forms an internal space that is open toward the transmission. An engine clutch 300 may be disposed in the open internal space in the rotor sleeve, and a circular-plate-shaped retainer having a spline structure may be inserted into the rotor sleeve.

To permit the retainer having a spline structure to be inserted into the rotor sleeve 100, the rotor sleeve 100 may include protrusions and grooves that extend in the axial direction of the rotor sleeve 100 and alternately formed along the inner circumferential wall surface of the rotor sleeve 100. The engine clutch 300 may be disposed in the open internal space in the cylindrical-shaped rotor sleeve 100, and the circular-plate-shaped retainer may be coupled to the rotor sleeve 100 and may cover the internal space in the rotor sleeve 100.

As illustrated in FIG. 3, spline protrusions 102 and spline grooves may be formed alternately on the inner wall surface of the rotor sleeve 100. In this configuration, the spline protrusions 102 and the spline grooves may be distinguished from each other based on the height in the inward direction from the outer circumferential surface of the rotor sleeve 100. Each of the spline protrusions 102 may be formed between left and right adjacent spline grooves to protrude in the inward direction and to extend in the axial direction of the rotor sleeve 100. Each of the spline grooves may be formed between left and right adjacent spline protrusions 102 to be indented and to extend in the axial direction of the rotor sleeve 100.

Figure 2:
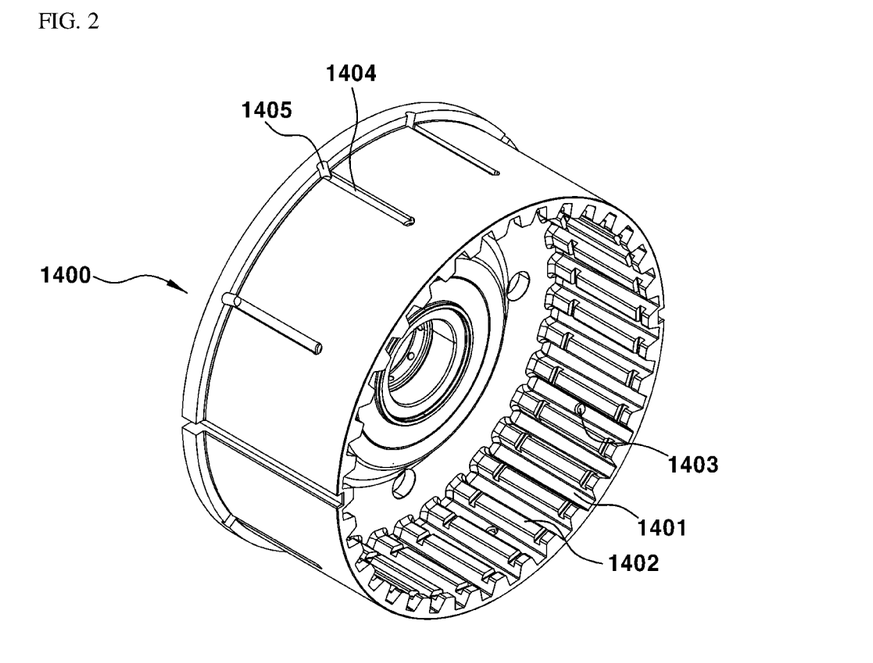
FIG. 2 is a view illustrating a rotor sleeve according to an exemplary embodiment of the present invention.

Therefore, according to the exemplary embodiment illustrated in FIG. 3, the spline protrusions 102 and the spline grooves may be formed alternately to be accurately engaged with the retainer having a spline structure. FIG. 2 illustrates a comparative example of a rotor sleeve 1400 in comparison with the exemplary embodiment of the present invention. The rotor sleeve 1400 of the driving motor illustrated in FIG. 2 has the same basic structure as the rotor sleeve illustrated in FIG. 3 in that spline protrusions 1402 and spline grooves 1401 are formed on the inner surface of the rotor sleeve. However, there is a difference in the shape of apertures 1403 formed in the inner surface of the rotor sleeve 1400 and in the shape of slots 1404 formed in the outer surface of the rotor sleeve 1400.

Referring to FIG. 2, the rotor sleeve 1400 according to the comparative example includes the apertures 1403 formed in the spline grooves 1401 to penetrate the inner and outer surfaces of the sleeve and slot portions 1404 formed in the outer surface of the sleeve in the axial direction through slot processing. In the rotor sleeve 1400 illustrated in FIG. 2, when the motor rotates, a portion of the oil flowing to the inner wall surface of the rotor sleeve 1400 is discharged toward the transmission through the spline grooves 1401. Another portion of the oil moves to the outer surface of the rotor sleeve 1400 through the apertures 1403 formed in the spline grooves 1401, and is discharged through outlet ports 1405 via the slot portions 1404 formed in the outer surface of the rotor sleeve, thereby being distributed toward the engine.

When manufacturing the rotor sleeve 1400 according to the comparative example, formation of the aperture and formation of the slot in the outer circumferential surface of the sleeve need to be performed simultaneously to form each path for distributing oil toward the engine. Thus, since manufacturing costs are increased in proportion to the number of paths for distributing oil toward the engine, there is a limitation to the extent to which the number of scattering or distribution paths is increased.

For example, 36 spline grooves 1401 may be formed in the rotor sleeve 1400, and apertures 1403 may be formed through only 6 to 8 of the 36 spline grooves 1401. However, in this case, oil may be distributed insufficiently toward the engine. On the other hand, 8 or more apertures 1403 may be formed in the rotor sleeve. However, in this case, the slot portions 1404 need to be formed in the same number as the number of apertures. Thus, a manufacturing process becomes complex, and manufacturing costs are excessively increased.

As illustrated in FIG. 3, the rotor sleeve 100 according to the exemplary embodiment of the present invention may include a plurality of spline grooves 101 and a plurality of spline protrusions 102 formed along the inner surface of the rotor sleeve 100. In addition, apertures 103 may be formed through at least some of the spline grooves 101. The apertures 103 serve to transfer the oil, having flowed to the inner surface of the rotor sleeve 100, to the outer surface of the rotor sleeve 100.

In addition, the rotor sleeve 100 according to the exemplary embodiment of the present invention may include slot portions 105 formed in the outer surface of the rotor sleeve 100 and outlet ports 106 for supplying oil introduced into the slot portions 105 to the engine. The outlet ports 106 may be formed in the end portions of the slot portions 105 that are oriented toward the engine through groove processing. A rotor core 200 may be fixed to the outer surface of the rotor sleeve 100. Thus, the outlet ports 106 may be defined by the contact surface between the grooves formed in the slot portions 105 and the rotor core 200.

The first feature of the exemplary embodiment, which is distinguished from the comparative example, is that an annular-shaped groove 104 may be formed in the outer surface of the rotor sleeve 100 in the circumferential direction. The annular-shaped groove 104 formed in the outer surface of the rotor sleeve may communicate with the apertures 103 and connect the slot portions 105 to each other. Therefore, it may be possible to greatly reduce the number of slot portions 105. Specifically, as illustrated in FIG. 3, the annular-shaped groove 104 formed in the outer surface of the rotor sleeve 100 in the circumferential direction may be connected to the apertures 103 that penetrate the inner surface and the outer surface of the rotor sleeve 100. In addition, the annular-shaped groove 104 may be connected to the slot portions 105 for discharging oil toward the engine.

As illustrated in FIG. 3, the annular-shaped groove 104 may be formed at a position that accurately corresponds to the positions of the apertures 103. Accordingly, the apertures 103 may be formed at the same positions as each other in the axial direction of the rotor sleeve. Thus, all of the apertures 103 are aligned with each other in the circumferential direction of the rotor sleeve to accurately communicate with the annular-shaped groove 104 formed in the circumferential direction of the rotor sleeve. With this configuration, oil having passed through all of the apertures 103 may be introduced into the annular-shaped groove formed in the outer surface of the rotor sleeve 100.

In addition, the annular-shaped groove 104 may extend in the axial direction in the outer surface of the rotor sleeve 100 and may be connected to the slot portions 105 extending toward the engine. Therefore, the oil introduced into the annular-shaped groove 104 may be discharged to the outlet ports 106 via the slot portions 105 and may be distributed toward the engine. As shown in FIG. 3, 36 spline grooves 101 may be formed in the inner surface of the rotor sleeve 100, and 18 apertures 103 may be formed in half the spline grooves 101. For example, each of slot portions 105 may include an axial-directional slot connected to a respective one of the outlet ports 106. The number of axial-directional slots may be less than the number of apertures 103.

According to the exemplary embodiment, although the slot portions 105 may be formed in a smaller number than the number of apertures 103, all of the oil discharged through all of the apertures 103 may be smoothly discharged toward the engine. Therefore, when manufacturing the rotor sleeve 100 according to the exemplary embodiment, although the number of axial-directional slots is maintained or reduced, the number of apertures 103 into which oil is introduced may be sufficiently increased, thereby increasing the amount of oil that is distributed toward the engine. Therefore, according to the exemplary embodiment of the present invention, it may be possible to greatly reduce the number of axial-directional slot portions 105 such that the number of apertures 103 becomes greater than the number of slot portions 105. Therefore, at least one of the slot portions 105 may be connected to two or more apertures 103.

In the case of the comparative example, the number of slot portions 105 needs to be increased to be the same as the number of apertures 103. However, since it is difficult to form the slot portions 105, there is a limitation to the extent to which the number of apertures 103 is increased. On the other hand, according to the exemplary embodiment of the present invention, it may be possible to sufficiently increase the number of apertures 103 while reducing the number of slot portions 105. Therefore, the amount of oil that is distributed toward the engine may be increased. As a result, it may be possible to increase the cooling efficiency with respect to the portion of the motor coil near the engine, which was lower than the cooling efficiency with respect to the portion of the motor coil near the transmission in the related art.

Figure 4:
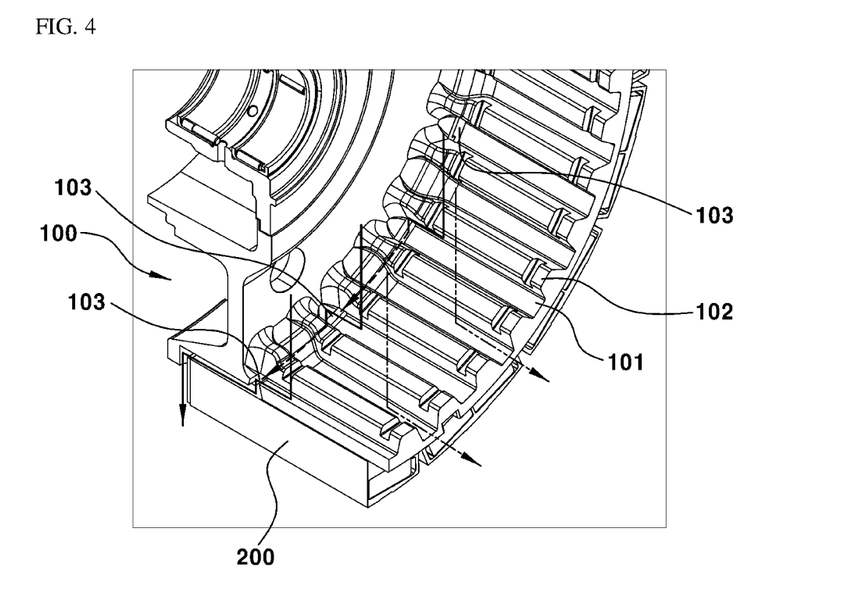
FIG. 4 is a partially-cut perspective view illustrating the state in which a retainer and an engine clutch are assembled to the rotor sleeve according to an exemplary embodiment of the present invention.

FIG. 4 is a partially-cut perspective view illustrating a portion of the rotor sleeve 100 in FIG. 3. FIG. 4 illustrates, in detail, paths along which the oil introduced into the rotor sleeve 100 flows to the portion of the motor coil near the transmission and the portion of the motor coil near the engine. As illustrated in FIG. 4, when the rotor sleeve 100 rotates about the input shaft, oil may flow downwards to the inner surface of the rotor sleeve 100 due to gravity.

At this time, the oil may flow into the spline grooves 101, each of which is disposed between adjacent spline protrusions 102. The oil introduced into the spline grooves 101 may flow toward the engine or toward the transmission. Specifically, the two-dot chain lines in FIG. 4 indicate the flow of oil to the portion of the motor coil near the transmission. As illustrated in FIG. 4, a portion of the oil introduced into the spline grooves 101 may flow toward the transmission, i.e. toward the open end of the rotor sleeve 100, along the spline grooves 101, and may be discharged outside the rotor sleeve 100. Thus, as illustrated in FIG. 1, the oil discharged along the spline grooves 101 may cool the portion of the motor coil near the transmission.

Meanwhile, the solid lines in FIG. 4 indicate the flow of oil to the portion of the motor coil near the engine. As illustrated in FIG. 4, a portion of the oil introduced into the spline grooves 101 moves in the opposite direction toward the engine, i.e. toward the closed end of the rotor sleeve 100, along the spline grooves 101. At this time, the oil moves to the outer surface of the rotor sleeve 100 through the apertures 103 formed in some of the spline grooves 101. As described above, the apertures 103 may communicate with the annular-shaped groove 104 formed in the outer surface of the rotor sleeve 100. Thus, the oil that passes through the apertures 103 may move to the annular-shaped groove 104. In addition, since the annular-shaped groove 104 may communicate with the slot portions 105, the oil introduced into the annular-shaped groove 104 may be move to the slot portions 105, and may finally be distributed to the portion of the motor coil near (e.g. proximate to) the engine through the outlet ports 106.

The exemplary embodiment illustrated in FIGS. 3 and 4 may include a first group of spline grooves 101a for guiding oil to be distributed to the portion of the motor coil near the transmission and a second group of spline grooves 101b for guiding oil to be distributed to the portion of the motor coil near the engine are alternately formed. The first group of spline grooves 101a is provided with the apertures 103, and the second group of spline grooves 101b is not provided with the apertures 103.

According to the exemplary embodiment of the present invention, to ensure the smooth flow of oil along the first group of spline grooves 101a and the second group of spline grooves 101b, an axial-directional path slope in the first group of spline grooves 101a and an axial-directional path slope in the second group of spline grooves 101b may be set to be different from each other. Due to the different path slopes, the size of the gap between the retainer 400 and the first group of spline grooves 101a and the size of the gap between the retainer 400 and the second group of spline grooves 101b become different from each other.

Figure 5:
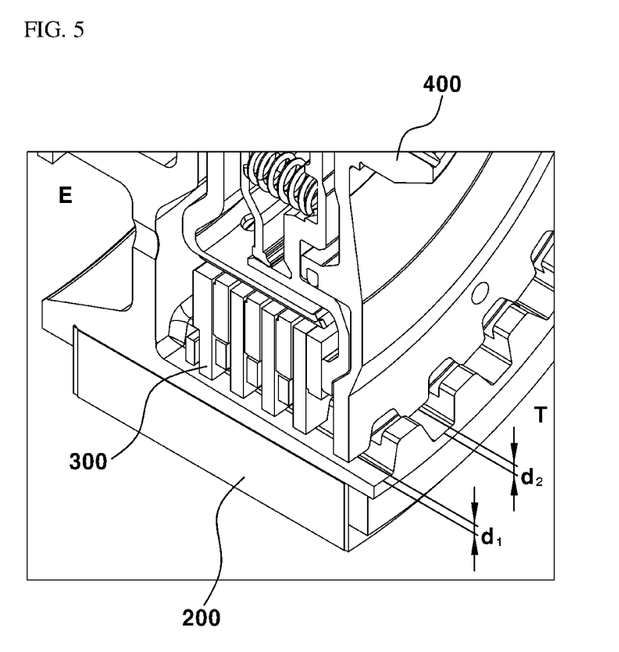
FIG. 5 is a sectional view taken along a spline groove included in a first group, in which a through-hole is formed, to show the state in which the retainer and the engine clutch are assembled to the rotor sleeve according to an exemplary embodiment of the present invention.

FIGS. 5 to 8 illustrate that the size of the gap between the retainer 400 and the first group of spline grooves 101a and the size of the gap between the retainer 400 and the second group of spline grooves 101b are different from each other due to the different axial-directional path slopes. FIG. 5 is a partially-cut perspective view illustrating the configuration in which the retainer 400 and the engine clutch are assembled to the rotor sleeve 100 according to the exemplary embodiment of the present invention.

As illustrated in FIG. 5, the retainer 400 may be coupled to the open end of the rotor sleeve 100 that is oriented toward the transmission, and oil may be distributed to the portion of the motor coil near or proximate to the transmission through the gap between the retainer 400 and the spline grooves 101 in the rotor sleeve 100. As illustrated in FIG. 5, according to the exemplary embodiment of the present invention, the first group of spline grooves (in which the apertures are formed) and the second group of spline grooves (in which the apertures are not formed) may be arranged alternately. Additionally, the gap d1 between the retainer 400 and the first group of spline grooves 101a and the gap d2 between the retainer 400 and the second group of spline grooves 101b have different sizes from each other.

In particular, the size of the gap between the retainer 400 and the spline grooves 101 may be appropriately varied by adjusting the slope of the spline grooves 101 of the rotor sleeve 100. In general, a slope may be formed at the open end (the end oriented toward the transmission) of the rotor sleeve 100 to allow oil to flow toward the transmission. As the slope of the spline grooves increases, the size of the gap between the spline grooves and the retainer increases. Conversely, as the slope of the spline grooves decreases, the size of the gap between the spline grooves and the retainer decreases.

Figure 7:
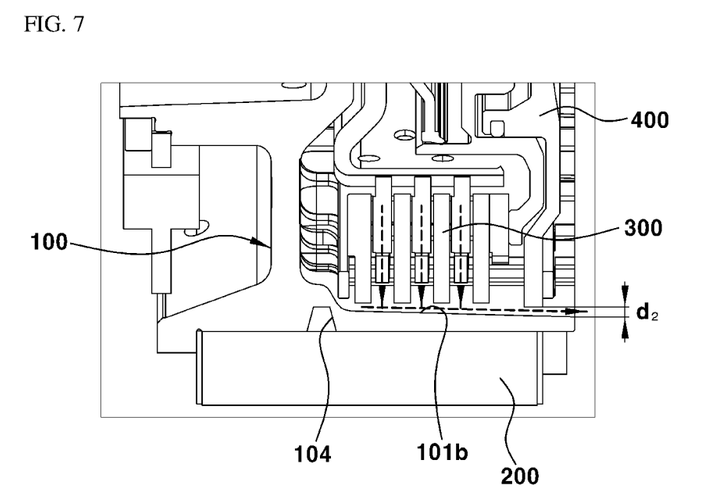
FIG. 7 is a view illustrating the state in which the retainer and the engine clutch are assembled to the rotor sleeve according to an exemplary embodiment of the present invention when viewed from a transmission.

The oil, which is distributed to the inner surface of the rotor sleeve 100 and gathers in the spline grooves 101, needs to be smoothly discharged through the gap between the rotor sleeve 100 and the retainer 400. In this regard, FIG. 7 illustrates the cross-section of the second group of spline grooves 101b, in which the apertures 103 are not formed. As illustrated in FIG. 7, a relatively large slope (e.g., approximately 1.5°) may be applied to the second group of spline grooves 101b in the axial direction. When the axial-directional slope is appropriately increased, the oil gathering in the spline grooves smoothly flows to the retainer (toward the transmission). In addition, the gap between the rotor sleeve 100 and the retainer 400 is increased, and thus the oil may discharged more smoothly.

Figure 6:
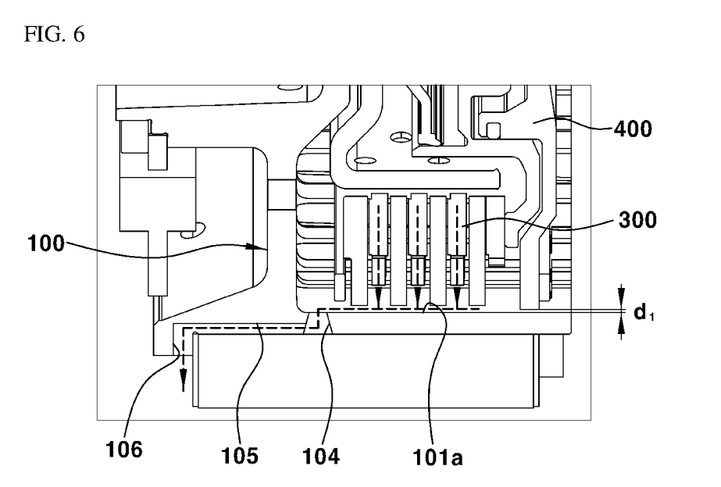
FIG. 6 is a sectional view taken along a spline groove included in a second group, in which a through-hole is not formed, to show the state in which the retainer and the engine clutch are assembled to the rotor sleeve according to an exemplary embodiment of the present invention.

FIG. 6 illustrates the cross-section of the first group of spline grooves, in which the apertures 103 are formed. According to the exemplary embodiment, the apertures 103, through which oil is discharged to the slot portions 105 formed in the outer surface of the rotor sleeve, may be formed in the inward portion of the first group of spline grooves (e.g., the portion opposite to the retainer-assembled portion in the overall length direction of the spline grooves). Therefore, it is desirable to minimize a slope formed at the first group of spline grooves 101a to cause the oil to flow smoothly through the apertures 103.

As illustrated in FIG. 6, the apertures 103, through which oil flows toward the engine, may be formed in the inward portion of the spline grooves 101. In addition, to cause the oil distributed into the rotor sleeve 100 to flow smoothly into the apertures 103, as shown in FIG. 6, a slope in the longitudinal direction of the spline may be minimized Thus, the gap between the rotor sleeve 100 and the retainer 400 may be set to a small value (e.g., about 0.5 mm or less) to cause most of the oil to flow into the apertures 103.

In addition, the apertures 103 may be disposed at positions further inward than the centers of the spline grooves 101 in the direction in which the retainer 400 is assembled. Accordingly, since the apertures 103 may be formed adjacent to the closed end of the rotor sleeve 100, i.e. adjacent to the engine, the utilization of the flow passages defined by the spline grooves 101 may be maximized, and thus the length of the slot portions 105 may be decreased. The decrease in the length of the slot portions 105 contributes to improvement of oil flow performance and simplification of the manufacturing process.

Figure 8:
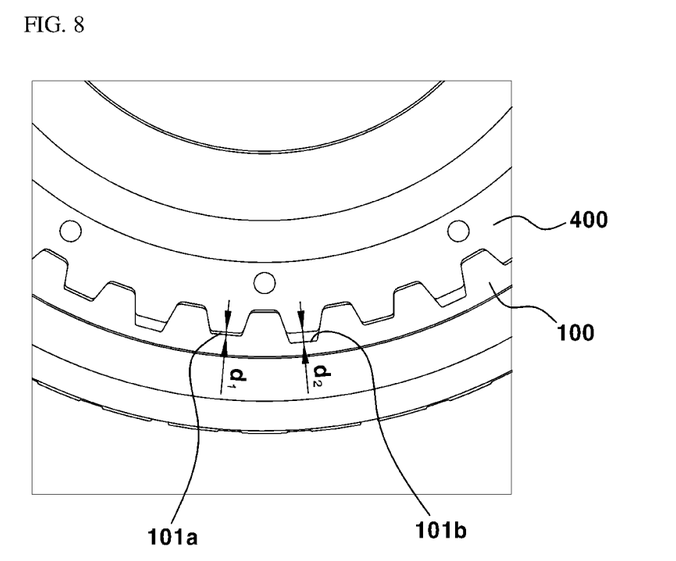
FIG. 8 is a view illustrating a rotor sleeve according to an exemplary embodiment of the present invention.

Referring to FIG. 8, depending on the presence or absence of the apertures, the axial-directional slopes of the spline grooves 101 formed in the inner surface of the rotor sleeve may be set to be different. Accordingly, the gap between the retainer and the first group of spline grooves and the gap between the retainer and the second group of spline grooves, through which oil is discharged toward the engine, are different sizes from each other. Therefore, it may be possible to adjust the amount of oil discharged from the respective groups.

FIGS. 6 and 7 show the flow path of the oil distributed to the portion of the motor coil near or proximate to the transmission and the flow path of the oil distributed to the portion of the motor coil near or proximate to the engine. As described above, with regard to the discharge toward the transmission, oil may flow smoothly in the outward direction (toward the retainer) due to the large axial-directional slope formed at the second group of spline grooves, and may be discharged through the relatively large gap d2 formed between the rotor sleeve 100 and the retainer 400 (refer to FIG. 7).

On the other hand, as illustrated in FIG. 6, with regard to the discharge toward the engine, the axial-directional slope of the spline grooves 101 may be minimized to thus decrease the gap between the rotor sleeve 100 and the retainer 400, thereby causing the oil to flow smoothly to the apertures 103. In other words, in the case of the spline grooves illustrated in FIG. 6, the amount of oil discharged through the gap between the rotor sleeve and the retainer may be decreased but the amount of oil discharged through the apertures 103 may be increased relative to the case illustrated in FIG. 7. The oil discharged through the apertures 103 gathers in the annular-shaped groove 104 formed in the outer surface of the rotor sleeve 100 in the circumferential direction and may be discharged outside through the slot portions 105. Thereafter, the oil may be distributed to the portion of the motor coil near the engine.

As illustrated in FIGS. 5 and 8, to adjust the amount of oil flowing toward the engine and the amount of oil flowing toward the transmission to be similar to each other, the gap d2 between the retainer and the second group of spline grooves, in which the apertures 103 are not formed, may be formed to be larger than the gap d1 between the retainer and the first group of spline grooves, in which the apertures 103 are formed.

Figure 9:
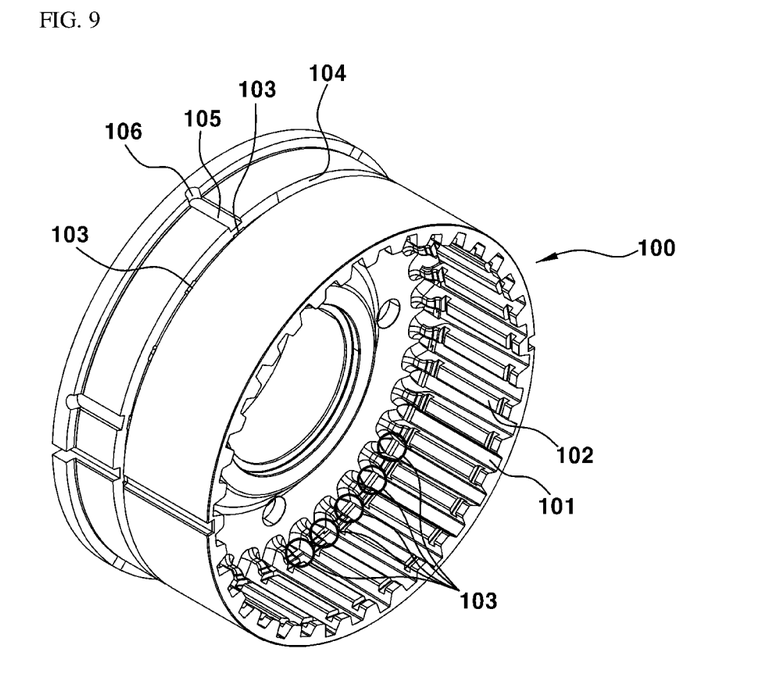
FIG. 9 is a view illustrating a rotor sleeve according to an exemplary embodiment of the present invention.
Figure 10:
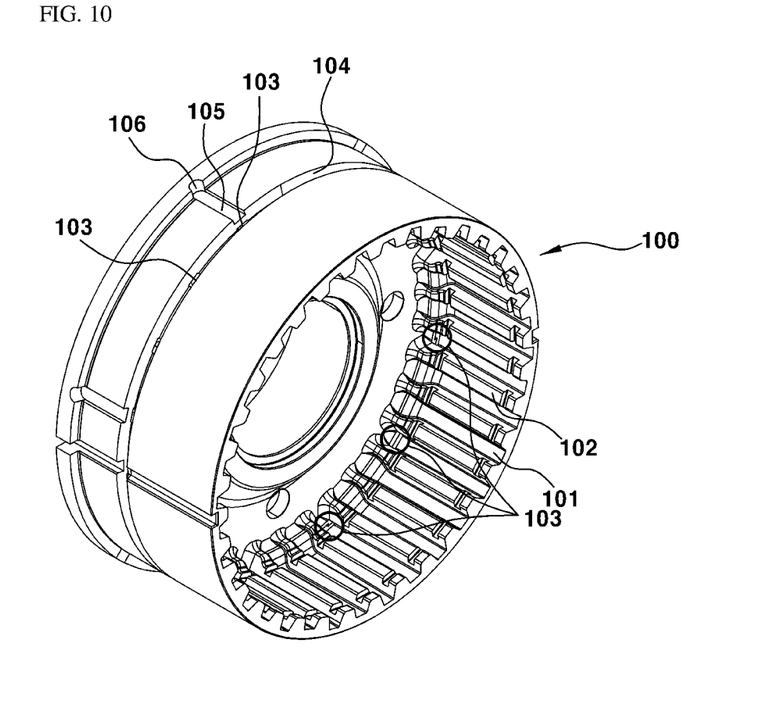
FIG. 10 is a view illustrating a rotor sleeve according to an exemplary embodiment of the present invention.

FIGS. 9 to 12 illustrate rotor sleeves according to other exemplary embodiments of the present invention. The configurations of an annular-shaped groove 104 and slot portions 105 formed in the outer surface of the rotor sleeve 100 illustrated in FIGS. 9 and 10 are the same as those in the previous exemplary embodiment. However, the rotor sleeve 100 illustrated in FIGS. 9 and 10 is different from the previous exemplary embodiment as to the number of apertures 103 formed in spline grooves in the inner surface of the rotor sleeve 100 while penetrating the circumferential surface of the rotor sleeve.

Specifically, FIG. 9 illustrates a rotor sleeve 100 according to a second exemplary embodiment of the present invention, in which the apertures 103 may be formed in all of the spline grooves 101 in the rotor sleeve 100. In this case, since the apertures 103 may be formed in all of the spline grooves 101, the amount of oil that is distributed to the portion of the motor coil near or proximate to the engine may be excessively large based on factors such as the size of the apertures 103. As illustrated in FIG. 8, it may be possible to adjust the size of the gap between the rotor sleeve 100 and the retainer 400 by varying the axial-directional slopes of some of the spline grooves. Accordingly, it may be possible to appropriately increase the amount of oil distributed to the portion of the motor coil near or proximate to the transmission due to the varied axial-directional slopes of the spline grooves.

FIG. 10 illustrates a rotor sleeve 100 according to a third exemplary embodiment of the present invention. The rotor sleeve 100 illustrated in FIG. 10 may include both a first group of spline grooves, in which apertures 103 are formed, and a second group of spline grooves, in which the apertures 103 are not formed. Two of the spline grooves included in the second group may be disposed between adjacent spline grooves included in the first group, in which the apertures 103 are formed. In other words, in the third exemplary embodiment in FIG. 10, the apertures 103 may be formed at a ratio of one per every three successive spline grooves.

The amount of oil distributed to the portion of the motor coil near or proximate to the engine may be less than that in the above-described second exemplary embodiment. In addition, similar to the second exemplary embodiment, it may be possible to increase or decrease the amount of oil distributed to the portion of the motor coil near or proximate to the transmission by appropriately adjusting the axial-directional slopes of the respective spline grooves 101.

Figure 11:
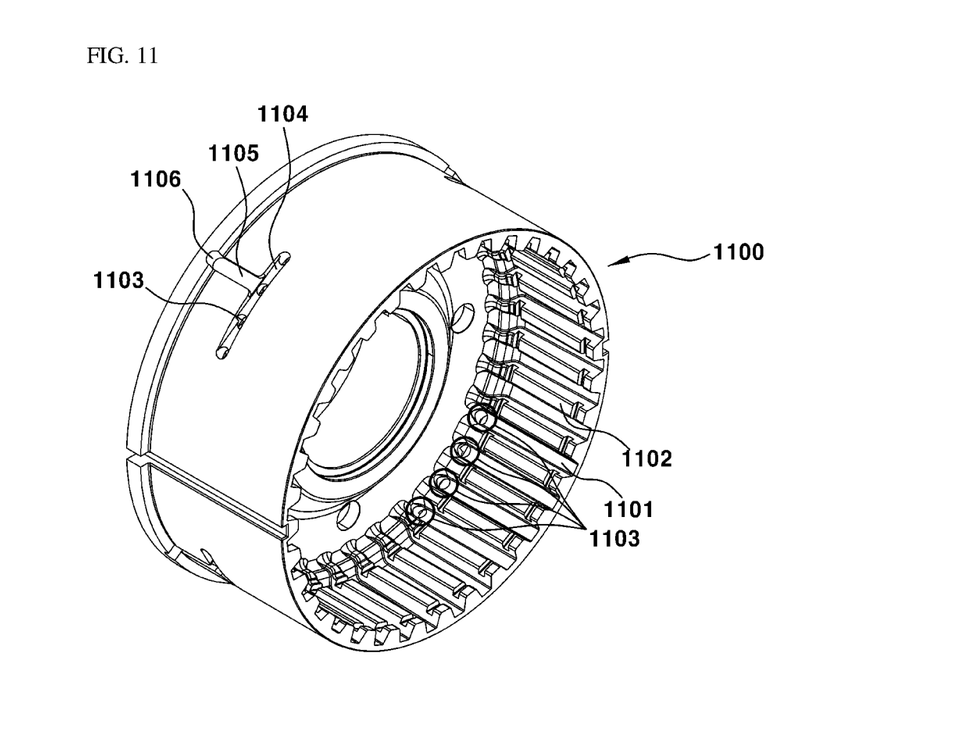
FIG. 11 is a view illustrating a rotor sleeve according to an exemplary embodiment of the present invention.
Figure 12:
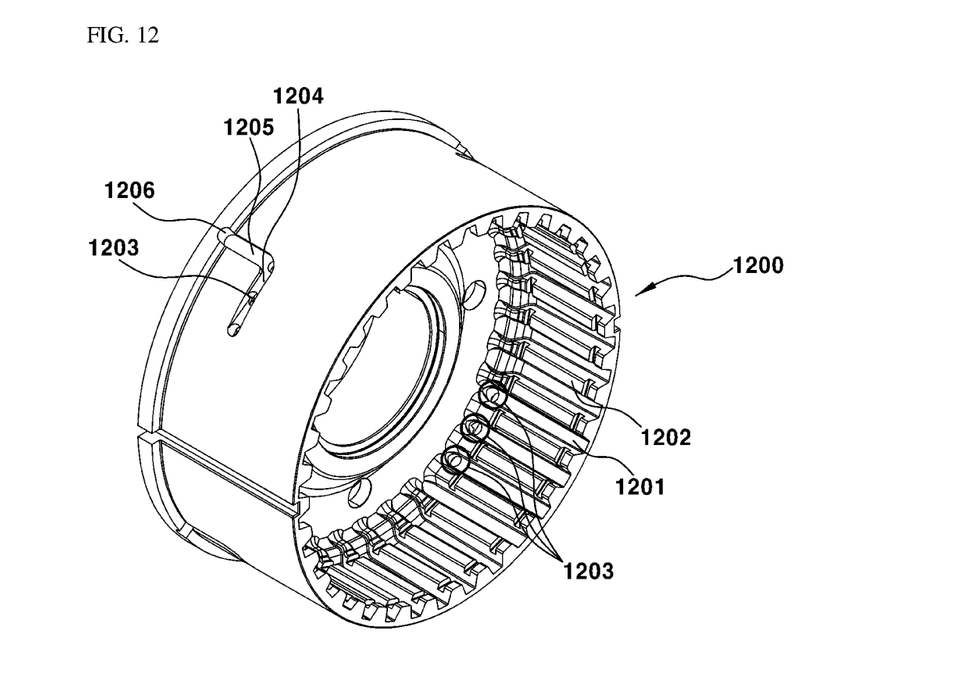
FIG. 12 is a view illustrating a rotor sleeve according to a comparative example.

FIGS. 11 and 12 illustrate rotor sleeves, each of which includes circumferential-directional slots, which extend along a portion of the outer surface of the rotor sleeve in the circumferential direction, instead of the annular-shaped groove 104 included in the first exemplary embodiment. FIG. 11 illustrates a rotor sleeve 1100 according to a fourth exemplary embodiment of the present invention, in which slot portions are formed in a "T" shape.

Specifically, referring to FIG. 11, different from the first exemplary embodiment including only the axial-directional slot portions, each of the slot portions may further include a circumferential-directional slot 1104 connected to the axial-directional slot 1105. The circumferential-directional slots 1104 perform substantially the same function as the annular-shaped groove 104 in the first exemplary embodiment. The circumferential-directional slots are formed to be connected with a plurality of apertures 1103. Thus, the exemplary embodiment illustrated in FIG. 11 does not require the same number of slot portions as the number of apertures. In other words, although the axial-directional slots 1105 are formed in a smaller number than the number of apertures 1103, the amount of oil distributed toward the engine may become equivalent to that in the comparative example. Outlet ports 1106 may also be formed at the ends of the axial-directional slots 1105.

The rotor sleeve according to the fourth exemplary embodiment illustrated in FIG. 11 has the same inner surface configuration as the second exemplary embodiment illustrated in FIG. 9. Thus, in the fourth exemplary embodiment, the apertures 1103 may be formed in all of the spline grooves 1101. However, the number of apertures may be adjusted as appropriate. For example, the apertures may be formed in the same manner as in the first exemplary embodiment in FIG. 3 or in the third exemplary embodiment in FIG. 10. In addition, like the above-described exemplary embodiments, the axial-directional slopes of the spline grooves 1101 may be adjusted as appropriate. Reference numeral "1102" denotes spline protrusions.

FIG. 12 illustrates a rotor sleeve 1200 of a driving motor according to a fifth exemplary embodiment of the present invention, in which slot portions are formed in an "L" shape. The exemplary embodiment in FIG. 12 has the same configuration as the exemplary embodiment in FIG. 11, except for the shape of the slot portions. In the exemplary embodiment in FIG. 12, axial-directional slots 1205 and circumferential-directional slots 1204 may be connected to each other to form the L-shaped slot portions. In addition, outlet ports 1206 may be formed at the ends of the axial-directional slots. Apertures 1203 may be formed in all of the spline grooves 1201. Similar to the above-described fourth exemplary embodiment, the number of apertures and the axial-directional slopes of the spline grooves may be appropriately changed. Reference numeral "1202" denotes spline protrusions.

As described above, in the exemplary embodiments illustrated in FIGS. 11 and 12, the T-shaped slot portions or the L-shaped slot portions may be formed in the outer surface of the rotor sleeve, instead of forming an annular-shaped groove in the circumferential direction. Accordingly, oil may be introduced into each of the slot portions via three or four apertures. Therefore, according to the exemplary embodiments in FIGS. 11 and 12, the number of oil inflow apertures may be maximized while reducing manufacturing costs by minimizing the number of slots. In addition, since an annular-shaped groove is not formed in the rotor sleeve in the circumferential direction, it may be possible to prevent deterioration of the rigidity of the rotor sleeve.

As is apparent from the above description, the present invention provides a rotor sleeve of a driving motor, which is capable of evenly scattering or distributing oil to the portion of a motor coil near or proximate to the transmission and the portion of the motor coil near or proximate to the engine, thereby improving motor-cooling performance. Particularly, the motor-cooling effect may be increased by diverting some of the oil, which was excessively distributed toward the transmission, toward the engine. In addition, since the portion of the motor coil near the transmission and the portion of the motor coil near the engine are cooled evenly, it may be possible to reduce error in measuring the temperature of the motor and consequently to more accurately control the motor.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A rotor sleeve of a driving motor, comprising:
   spline grooves formed in an inner surface of the rotor sleeve;
   a plurality of apertures formed in at least some of the spline grooves; and
   two or more slot portions formed in an outer surface of the rotor sleeve, the slot portions being configured to guide a fluid introduced through the apertures to outlet ports,
   wherein at least one of the slot portions is connected to two or more apertures, and a retainer is coupled to the rotor sleeve through the spine grooves.

2. The rotor sleeve of claim 1, wherein each of the slot portions includes:
   an axial-directional slot connected to a respective one of the outlet ports,
   wherein the axial-directional slot is formed in a smaller number than a number of the apertures.

3. The rotor sleeve of claim 2, wherein each of the slot portions includes:
   a circumferential-directional slot connected to the axial-directional slot,
   wherein the circumferential-directional slot is connected to the plurality of apertures.

4. The rotor sleeve of claim 3, wherein each of the slot portions has one of a "T" shape and an "L" shape.

5. The rotor sleeve of claim 1, wherein the plurality of apertures are disposed at positions further inward than centers of the spline grooves in a direction in which the retainer is coupled.

6. The rotor sleeve of claim 1, wherein the plurality of apertures are formed at same positions in an axial direction.

7. The rotor sleeve of claim 6, further comprising:
   a groove formed in an outer circumferential surface of the rotor sleeve, the groove having an annular shape,
   wherein the groove is connected to the plurality of apertures.

8. The rotor sleeve of claim 1, wherein each of the apertures is formed in a respective one of the spline grooves.

9. The rotor sleeve of claim 1, wherein the spline grooves are divided into a first group, in which the apertures are formed, and a second group, in which the apertures are not formed, and wherein the first group has an axial-directional slope different from an axial-directional slope of the second group.

10. The rotor sleeve of claim 9, wherein the axial-directional slope of the first group is smaller than the axial-directional slope of the second group.

11. The rotor sleeve of claim 9, wherein the spline grooves in the second group are disposed between adjacent ones of the spline grooves in the first group, and wherein a number of the spline grooves in the second group, disposed between adjacent ones of the spline grooves in the first group, is constant.

12. A driving motor, comprising:
    a rotor sleeve of claim 1; and
    a stator core around which a coil is wound.

* * * * *